(12) United States Patent
Zhu et al.

(10) Patent No.: US 11,260,979 B2
(45) Date of Patent: Mar. 1, 2022

(54) AIRCRAFT ENVIRONMENTAL CONTROL SYSTEM

(71) Applicant: Hamilton Sundstrand Corporation, Charlotte, NC (US)

(72) Inventors: Yonghua Zhu, Cork (IE); Catherine Thibaud, Cork (IE); Mathieu Le Cam, Cobh (IE); Erica Zavaglio, Cork (IE); Giovanni Franzini, Cork (IE)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 140 days.

(21) Appl. No.: 16/710,147

(22) Filed: Dec. 11, 2019

(65) Prior Publication Data
US 2020/0377217 A1 Dec. 3, 2020

(30) Foreign Application Priority Data
May 31, 2019 (EP) .................................... 19177719

(51) Int. Cl.
*B64D 13/08* (2006.01)
*B64D 13/06* (2006.01)
*F02C 6/08* (2006.01)

(52) U.S. Cl.
CPC .............. *B64D 13/08* (2013.01); *B64D 13/06* (2013.01); *F02C 6/08* (2013.01); *B64D 2013/0618* (2013.01); *B64D 2013/0688* (2013.01)

(58) Field of Classification Search
CPC ................... B64D 13/08; B64D 13/06; B64D 2013/0618; B64D 2013/0688; F02C 6/08
See application file for complete search history.

(56) References Cited

U.S. PATENT DOCUMENTS

| 4,419,926 A | | 12/1983 | Cronin et al. |
| 5,025,642 A | * | 6/1991 | Brunskill .............. F28D 9/0062 62/402 |
| 5,461,882 A | * | 10/1995 | Zywiak ............. B60H 1/00007 62/401 |
| 5,704,218 A | * | 1/1998 | Christians .............. B64D 13/06 62/172 |
| 5,967,461 A | | 10/1999 | Farrington |

(Continued)

FOREIGN PATENT DOCUMENTS

| EP | 3144224 A1 | 3/2017 |
| EP | 3354573 A1 | 8/2018 |
| EP | 3480113 A1 | 5/2019 |

OTHER PUBLICATIONS

The Extended European Search Report for Application No. 19177719.2—1010; Report dated Oct. 31, 2019 Report dated Nov. 7, 2019; 7 pages.

*Primary Examiner* — Gordon A Jones
(74) *Attorney, Agent, or Firm* — Cantor Colburn LLP

(57) ABSTRACT

An aircraft environmental control system comprising a bleed air or compressed ambient air input and a RAM air input, heat exchanger means for receiving bleed air from the bleed air input and RAM air from the RAM air input and using RAM air to cool the bleed air, and means for providing the cooled bleed air to an interior of the aircraft; the system further comprising means for feeding back exhaust air emitted from the interior of the aircraft to combine with the RAM air to further cool the bleed air or compressed ambient air.

7 Claims, 1 Drawing Sheet

(56) References Cited

U.S. PATENT DOCUMENTS

| | | | | |
|---|---|---|---|---|
| 6,199,387 B1* | 3/2001 | Sauterleute | ............ | B64D 13/06 |
| | | | | 62/87 |
| 6,257,003 B1* | 7/2001 | Hipsky | ................. | B64D 13/06 |
| | | | | 62/88 |
| 6,948,325 B1* | 9/2005 | Axe | ....................... | B64D 13/06 |
| | | | | 62/127 |
| 9,669,936 B1 | 6/2017 | Fiterman et al. | | |
| 9,809,314 B2* | 11/2017 | Bammann | .............. | B64D 13/06 |
| 10,086,946 B1 | 10/2018 | Zywiak et al. | | |
| 10,160,547 B2 | 12/2018 | Bruno et al. | | |
| 2013/0160472 A1* | 6/2013 | Klimpel | ................... | F25B 9/06 |
| | | | | 62/87 |
| 2014/0080397 A1* | 3/2014 | Surawski | .............. | B64D 13/08 |
| | | | | 454/71 |
| 2015/0065025 A1* | 3/2015 | Bruno | ................... | B64D 13/04 |
| | | | | 454/74 |
| 2017/0275004 A1* | 9/2017 | Bammann | .............. | B64D 13/04 |
| 2020/0130849 A1* | 4/2020 | Hennig | ................. | B64D 13/06 |

* cited by examiner

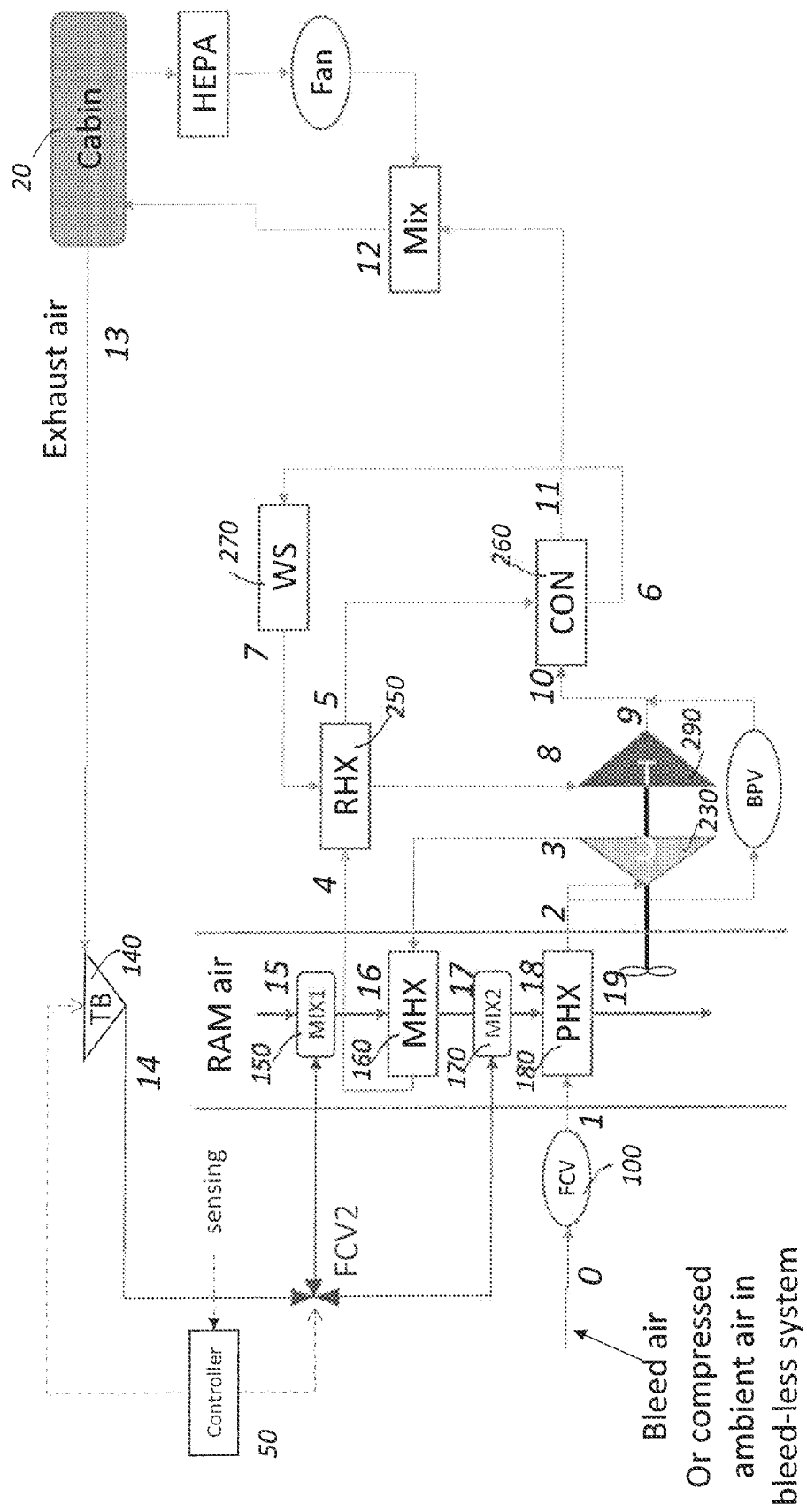

AIRCRAFT ENVIRONMENTAL CONTROL SYSTEM

FOREIGN PRIORITY

This application claims priority to European Patent Application No. 19177719.2 filed May 31, 2019, the entire contents of which is incorporated herein by reference.

TECHNICAL FIELD

The present disclosure is concerned with environmental control systems for aircraft which provide pressurised and conditioned air to the aircraft cabin for the health and comfort of passengers and crew.

BACKGROUND

Environmental control systems (ECS) are provided in aircraft to provide pressurised and conditioned air to the inside of the aircraft cabin. Regulations provide for the minimum flow or conditioned air into the cabin per passenger. The Federal Aviation Authority (FAA) requires the fresh air flow rate to be at least 0.25 kg/min per passenger to dilute contaminants generated in the cabin, to provide thermal comfort and oxygen for occupants and to maintain cabin pressure. An ECS must be able to comply with such regulations while maximising efficiency in terms of power consumption but also minimizing overall size and weight of the ECS.

Generally, particularly in commercial aircraft, fresh air from the aircraft engine (bleed air), or compressed ambient air, is used to provide the ECS air flow. The incoming air is, however, at a relatively high temperature and pressure and so needs to be conditioned to the appropriate temperature and pressure for cabin air before it is fed into the cabin. The way this is usually done is to use ambient air, brought into the system via a RAM air intake device, such as scoop. This air—so-called RAM air—is used in a system of heat exchangers to cool the bleed air or compressed ambient air. The RAM air is firstly used in a main heat exchanger (MHX) as a heat sink to cool the bleed air or compressed ambient air and then in a primary heat exchanger (PHX). By the time the RAM air has passed through the MHX, its temperature has already increased substantially. The RAM air is the sole heat sink for the bleed air and so its flow rate and temperature are the key factors that affect the efficiency and capacity of the heat exchangers and eventually the fuel consumption of the ECS. Introduction of RAM air creates drag on the aircraft and therefore introduces an energy or fuel penalty. In normal conditions up to two or three times as much RAM air as bleed air or compressed ambient air is required to condition the air provided to the cabin. The more RAM air required, the greater the energy/fuel penalty. RAM air penalty is one of the factors that determine ECS energy consumption. The ECS of an aircraft consumes the majority of the non-propulsive power.

There is great pressure on the aircraft industry to improve energy efficiency and to reduce emissions and there is, therefore, a need for a more energy efficient ECS.

SUMMARY

When an ECS operates, fresh and conditioned air is introduced into the cabin. An overboard valve is also used to exhaust the correct amount of air from the cabin and maintain the prescribed pressure. During flight, the exhaust air is usually at a higher temperature and pressure than ambient air but has already been cooled by the air conditioning system and is, therefore, cooler than, and at a lower pressure than incoming bleed air or compressed ambient air. The exhaust air is dumped overboard and, although, as described above, much energy has been involved in conditioning that air for use in the ECS, the air exhausted from the ECS is essentially wasted. The present inventors have considered how this exhaust air can be made use of in conditioning bleed air/compressed ambient air input into the ECS to avoid complete waste of the energy that went into conditioning the air from which the exhaust air derives.

According to the present disclosure, there is an aircraft environmental control system comprising a fresh air input and a RAM air input, heat exchanger means for receiving fresh air from the fresh air input and RAM air from the RAM air input and using the RAM air to cool the fresh air, and means for providing the cooled fresh air to a cabin of the aircraft, the system further comprising means for feeding back exhaust air emitted from the cabin of the aircraft to combine with the RAM air to further cool the fresh air.

Preferably, the ratio of fed-back exhaust air and RAM air to cool the fresh air is determined based on the temperature and/or pressure of the exhaust air.

In the preferred embodiment, a controller is provided to control the ratio of fed-back exhaust air and RAM air to cool the fresh air.

In the preferred embodiment, the exhaust air is expanded by a turbine and divided into two streams, a first stream to be mixed with RAM air entering into a main heat exchanger for cooling fresh air, and a second stream to be mixed with RAM air exiting the main heat exchanger. The flow of exhaust air via the two streams is controlled by a controller based on the temperature of the exhaust air compared to the temperature of the RAM air.

The preferred ECS includes a main heat exchanger and a primary heat exchanger to condition fresh air, a first mixer to mix expanded exhaust air with RAM air prior to entry into the main heat exchanger and a second mixer to mix expanded exhaust air with RAM air after the main heat exchanger and prior to entry into the primary heat exchanger.

The fresh air is preferably either compressed ambient air fed in via a compressor or bleed air from the aircraft engine.

In another aspect, the disclosure provides a method of conditioning aircraft engine bleed air or compressed ambient air for input into an aircraft cabin, comprising combining RAM air and exhausted conditioned air from the aircraft cabin to reduce the temperature of the bleed air or compressed ambient air.

BRIEF DESCRIPTION OF THE DRAWINGS

FIG. 1 is a schematic view of an environmental control system according to the preferred embodiment in accordance with the disclosure.

DETAILED DESCRIPTION

The system of the present disclosure makes use of the cabin exhaust air, which has already been cooled and conditioned by the ECS, though it has become warmer in the cabin, to condition incoming bleed air or compressed ambient air to make use of the energy invested in creating the exhaust air and to reduce the amount of RAM air and, thus, energy, for conditioning the bleed air or compressed ambient air for cabin air conditioning.

FIG. 1 shows one embodiment of an ECS according to the disclosure. It is envisaged that other configurations could fall within the scope of the invention as described by the claims.

First, the parts of the ECS also known from conventional ECS systems will be described.

The ECS is provided to provide conditioned air to the aircraft cabin 20. The source air is bleed air 0 from the aircraft engine. In an alternative embodiment, the source air can be compressed ambient air, via a compressor, rather than air from the engine. This is provided to the ECS via a flight control valve 1 which changes position depending on flight conditions of the aircraft. As the bleed air or compressed ambient air temperature and pressure are too high for the conditioned air, cool RAM air 15 is provided into the ECS. The RAM air is used as the cooling or working fluid in a heat exchange system to which the bleed air or compressed ambient air is provided as the fluid to be cooled. The heat exchange system can be any available heat exchanger known in the art. In the examples shown, the heat exchange system comprises a main heat exchanger MHX 160 followed by a primary heat exchanger PHX 180. The RAM air acts as a heat sink, in the heat exchange system, thus cooling and reducing the pressure of the bleed air or compressed ambient air. After the primary heat exchanger, the bleed air or compressed ambient air is divided into two streams: the main one goes into the compressor 230 and the second one bypasses a portion of the system and is integrated again at the turbine, 290, outlet. After the compression phase, the main stream passes through the main heat exchanger and then passes through the hot side of the reheater, RHX, 250 and condenser, CON, 260 where condensates form. After entering the water separator, WS, 270 the collected condensate is sprayed into the RAM channel to enhance heat transfer effect. The export dry air undergoes temperature and pressure reductions in the turbine, T, 290 after passing through the cold side of RHX. The conditioned bleed air is provided via the cold side of the condenser 260 to the cabin 20 to set the cabin air to the desired temperature and pressure. The cabin air needs to be maintained at the required temperature and pressure, and as the air becomes warm it is fed out of the cabin as exhaust air 13 and is replaced by new conditioned air. As mentioned above, this exhaust air is then usually just emitted to the outside environment as waste.

The present systems make use of the exhaust air and the fact that there is usually a large pressure difference between cabin and ambient air in a cruise condition, and uses the exhaust air to cool the bleed air or compressed ambient air thus reducing the amount of RAM air needed to cool the bleed air.

The exhaust air can be introduced into the ECS to cool the bleed air or compressed ambient air at different points in the system, as the temperature of the RAM air changes after heat transfer with MHX and PHX.

In the embodiment of FIG. 1, exhaust air 13 is provided to a turbine 140 which expands (and thus reduces the pressure and temperature of) the exhaust air and energy from the exhaust air could be used to power other devices. The expanded exhaust air from the turbine is then split into two streams, the flow rate of which is regulated by a three-way control valve FCV2. A first stream is mixed at a first mixer 150 with RAM air. The amount of RAM air added to the mix will depend on the amount and conditions of the exhaust air and will be set by a controller 50. The mixed exhaust air and RAM air are provided to the main heat exchanger MHX 160. The RAM air from the main heat exchanger is then mixed with the second stream of expanded air, at a second mixer 170. This mix is then provided to the primary heat exchanger 180 which also receives the bleed air. The exhaust/RAM air mix acts as the cooling fluid in the primary heat exchanger 180 and thus acts as a heat sink for the bleed air. The cooled air is then provided to the cabin in the same way as described above for known ECS systems.

The controller 50 determines how much expanded air flows in the two streams by simple or advanced control logics. For example, if RAM air temperature before the first mixer 150 is lower than the expanded exhaust air, no expanded exhaust air might go to the first mixer so that the RAM air is not heated up, to avoid cooling offset. In a more advanced control logic, the optimal ratio between the first and second stream may be obtained by optimising the overall heat transfer efficiency of the main and primary heat exchangers. If there is no difference between cabin pressure and RAM air pressure, the exhaust air cannot be expanded by the turbine and so the controller 50 will regulate the turbine to be off.

The embodiment can be further explained using some calculations based on example values. This is given purely by way of example only. It is based on bleed air from engine.

According to FAA regulations, the mandatory requirement for fresh air is 0.25 kg air per min per passenger. That means, for an ordinary aircraft like A320 with 180 seats, the fresh air (bleed air) in total is around 0.75 kg/s. In order to maintain stable pressure, equivalent air flow to bleed air is to be dissipated either from exhaust air valve or unplanned leakage.

Assuming the leakage percentage is 10%, then the exhaust air flow rate is about.

90%*0.75 kg/s=0.675 kg/s in total, i.e. 0.3375 kg/s for each pack in a dual-pack aircraft when such exhausted air is utilized as described.

As mentioned above, normally RAM air flow is about 2~3 times of bleed air. However, in these calculations we will use a more conservative value of 1.5 times, that is 1.125 kg/s in total, or 0.5625 kg/s for each pack in a dual-pack aircraft.

Also, according to FAA regulation, minimum cabin pressure under normal operating conditions should not be less than the pressure of 75.3 kPa. While in the normal cruise altitude e.g. 11 km, the RAM air pressure is around 20 kPa. Due to the pressure recovery effect and a scoop, the RAM air pressure in MHX could rise to a higher pressure, e.g. 25 kPa. The calculations assume the RAM air temperature after the scoop is around −30 deg. C in the cruise flight condition.

For an isentropic expansion, the turbine outlet temperature could be estimated by the following equation:

$$\frac{T_{out}}{T_{in}} = 1 - \eta \left[ 1 - \left( \frac{p_{out}}{p_{in}} \right)^{\frac{\gamma-1}{\gamma}} \right]$$

Where η is the turbine efficiency (assume here it is 0.75), γ is the isentropic expansion ratio of air (assuming it is 1.4). Assume the cabin pressure is 80 kPa and the cabin temperature is 24 deg. C (T13), and the RAM air pressure of MHX outlet is 25 kPa, then the exhaust air temperature leaving the turbine is:

$T14=(24+273.15)*\{1-0.75*[1-(25/80)^{(0.4/1.4)}]\}=234$ K (−39 C)

If we assume two ECS are needed to provide 140 kW cooling capacity (i.e. 70 kW for each ECS) for accommodating heat from the hot bleed air, heat generated in the cabin by passengers, electronic devices, galley and heat gained from solar radiation, etc., and average heat effectiveness of MHX and PHX is 0.78, and the bleed air inlet temperature is 200 deg. C (in PHX inlet). Then the RAM air temperature after the first mixer 150, is estimated by following equation:

$$Q=\xi*(m\_flow*Cp)\min*(T1-T16)$$

Where the (m_flow*Cp)min is the minimum heat capacity of two air streams, i.e. the bleed air flow and the mixed RAM air, and the Cp is the specific heat capacity (roughly 1.01 kJ/kg.K).

The value is:

$$T16=(200+273.15)-70/(0.375*1.01)/0.78=235.5 \text{ K} (-37.5 \text{ C})$$

According to perfect mixing theory and ignoring the variations of specific heat capacity of the air, the RAM air and expanded exhausted air satisfy the following equation:

$$T15*m\_flow\_RAM+T14*m\_flow\_exh=T16*(m\_flow\_RAM+m\_flow\_exh)$$

Therefore, required RAM air flow is obtained by:

$$m\_flow\_RAM=m\_flow\_exh*(T14-T16)/(T16-T15)$$

Given the RAM air temperature is −30 C, the RAM air flow rate under this scenario is:

$$m\_flow\_RAM=0.3375*(234-235.5)/(235.5-243)=0.0675 \text{ kg/s}$$

Without this invention, i.e., based on the original RAM air flow (0.5625 kg/s) and temperature, even if the heat transfer effectiveness is still 0.78, the cooling capacity is:

$$Q=(0.375*1.01)*0.78*(200-(-30))=68 \text{ kW}$$

That means, the expanded exhausted air not only helps reducing RAM air introduction but also boosts the cooling capacity of the ECS. The RAM air flow rate reduction is at least:

$$(0.5625-0.0625)/0.5625=89\%$$

According to some research, the fuel burn for RAM air introduction is around 60 lb/h (0.008 kg/s), thus the fuel saving here is around 60*0.5625*89%=30 lb/h.

On the other hand, there is some fuel burn penalty due to increased weight of the turbine, duct, valve and the mixers. A turbine is usually about 20 kg for similar airflow rates to those discussed here, and the fuel burn is around 0.07 lb/h/kg, which means that the fuel penalty because of the weight adding of the (two) turbines is around 3 lb/h.

Assuming other components in total are also 40 kg, then the overall fuel penalty will be about 6 lb/h.

When the aircraft is in other flight phases, e.g. at ground, there is almost no pressure difference between cabin and RAM air, and the benefit from utilizing expanded exhaust air will be compromised. However, as the cruise takes the majority of the flight time, the overall fuel burn reduction would be less than but close to 24 lb/h, which is a noticeable fuel saving (0.41% reduction for a flight with 5800 lb/h fuel consumption).

The use of exhaust air in cooling the bleed air results in a significant demand for RAM air in the ECS thus resulting in energy savings as well as allowing smaller, lighter components, such as the RAM turbine. The RAM air flow rate requirement is reduced for the majority of the flight so long as conditions allow the exhaust gas to be expanded at the turbine. This also, in turn, allows the drag due to the RAM air turbine to be decreased and, thus, allows the energy/fuel penalty to be decreased.

The invention claimed is:

1. An aircraft environmental control system comprising:
    a fresh air input and a RAM air input, heat exchanger means for receiving fresh air from the fresh air input and RAM air from the RAM air input and using RAM air to cool the fresh air, and
    means for providing the cooled fresh air to a cabin of the aircraft;
    the system further comprising means for feeding back exhaust air emitted from the cabin of the aircraft to combine with the RAM air to further cool the fresh air, a main heat exchanger and a primary heat exchanger to condition fresh air, a first mixer to mix expanded exhaust air with RAM air prior to entry into the main heat exchanger and a second mixer to mix expanded exhaust air with RAM air after the main heat exchanger and prior to entry into the primary heat exchanger.

2. The system of claim 1, wherein a ratio of fed-back exhaust air and RAM air to cool the fresh air is determined based on the temperature and/or pressure of the exhaust air.

3. The system of claim 1, wherein a controller is provided to control the ratio of fed-back exhaust air and RAM air to cool the fresh air.

4. The system of claim 1, wherein the exhaust air is expanded by a turbine and divided into two streams, a first stream to be mixed with RAM air entering into a main heat exchanger for cooling fresh air, and a second stream to be mixed with RAM air exiting the main heat exchanger.

5. The system of claim 4, wherein the flow of exhaust air via the two streams is controlled by a controller based on the temperature of the exhaust air compared to the temperature of the RAM air.

6. The system of claim 1, wherein the fresh air is compressed ambient air.

7. The system of claim 1, wherein the fresh air is bleed air from an engine of the aircraft.

* * * * *